US009528002B2

(12) United States Patent
Bloyaert et al.

(10) Patent No.: US 9,528,002 B2
(45) Date of Patent: Dec. 27, 2016

(54) MANUFACTURE AND USE OF A COMPOSITE MATERIAL COMPRISING FIBRES AND AT LEAST ONE VINYL CHLORIDE POLYMER (75) Inventors: Claudine Bloyaert, Waterloo (BE); Francois Van Loock, Machelen (BE); Daniel Martinz, Brussels (BE)

(73) Assignee: SOLVAY SA, Brussels (BE)

( * ) Notice: Subject to any disclaimer, the term of this patent is extended or adjusted under 35 U.S.C. 154(b) by 18 days.

(21) Appl. No.: 14/009,588

(22) PCT Filed: Apr. 5, 2012

(86) PCT No.: PCT/EP2012/056306
§ 371 (c)(1),
(2), (4) Date: Oct. 3, 2013

(87) PCT Pub. No.: WO2012/139972
PCT Pub. Date: Oct. 18, 2012

(65) Prior Publication Data
US 2014/0094543 A1    Apr. 3, 2014

(30) Foreign Application Priority Data

Apr. 11, 2011 (FR) ........................ 11 53150
Nov. 8, 2011 (FR) ........................ 11 60168

(51) Int. Cl.
*C08K 3/40* (2006.01)
*C08K 3/34* (2006.01)
(Continued)

(52) U.S. Cl.
CPC ................. *C08L 97/02* (2013.01); *C08J 5/045* (2013.01); *C08K 3/34* (2013.01); *C08K 3/40* (2013.01);
(Continued)

(58) Field of Classification Search
CPC ......... C08J 5/043; C08J 2327/06; C08J 5/045; C08J 5/044; E06B 3/22; Y10T 428/2967; C08K 7/14; C08K 3/40; C08K 3/34; C08L 27/06
(Continued)

(56) References Cited

U.S. PATENT DOCUMENTS 3,632,366 A  * 1/1972 Hiraga .................... C03C 25/26
                                                           264/140
3,869,310 A    3/1975 Fukushima et al.
(Continued)

FOREIGN PATENT DOCUMENTS

CA         1279033 C      1/1991
DE       19933099 A1      1/2001
(Continued)

OTHER PUBLICATIONS

U.S. Appl. No. 12/515,693, filed May 20, 2009, Claude Dehennau, et al.

*Primary Examiner* — Susannah Chung
*Assistant Examiner* — Josephine Chang
(74) *Attorney, Agent, or Firm* — Jarrod N. Raphael (57) ABSTRACT Process for manufacturing a composite material comprising fibers and at least one vinyl chloride polymer comprising the immersion of the fibers in a hydrosol of said polymer in order to obtain fibers coated with said hydrosol followed by the drying and gelling of said hydrosol coated on the fibers. Composite material and use thereof for forming articles or for manufacturing reinforcing objects. Profiles reinforced by this composite material.

14 Claims, 3 Drawing Sheets

(51) Int. Cl.
*C08L 97/02* (2006.01)
*C08J 5/04* (2006.01)
*E06B 3/22* (2006.01)
*C08K 7/14* (2006.01)

(52) U.S. Cl.
CPC .............. *C08J 2327/06* (2013.01); *C08K 7/14* (2013.01); *E06B 3/22* (2013.01); *Y10T 428/2967* (2015.01)

(58) Field of Classification Search
USPC ................ 427/385.5, 512; 428/394; 524/567
See application file for complete search history.

(56) References Cited

U.S. PATENT DOCUMENTS

| | | | |
|---|---|---|---|
| 3,897,533 A | 7/1975 | Hani et al. | |
| 4,433,020 A | 2/1984 | Narukawa et al. | |
| 4,492,063 A | 1/1985 | Schock et al. | |
| 4,514,449 A | 4/1985 | Budich et al. | |
| 4,543,288 A | 9/1985 | Radvan et al. | |
| 4,707,231 A | 11/1987 | Berger | |
| 5,139,593 A | 8/1992 | Dominique et al. | |
| 5,792,529 A | 8/1998 | May | |
| 6,025,285 A | 2/2000 | Vyakarnam et al. | |
| 6,733,845 B1 | 5/2004 | Caramaro et al. | |
| 6,844,040 B2 | 1/2005 | Pabedinskas et al. | |
| 6,920,726 B2 | 7/2005 | Bielefeld et al. | |
| 7,198,840 B2 * | 4/2007 | Lee et al. | 428/297.4 |
| 7,258,913 B2 | 8/2007 | Jo et al. | |
| 7,402,268 B2 | 7/2008 | Boissonnat et al. | |
| 7,534,473 B2 | 5/2009 | Marduel | |
| 7,622,576 B1 | 11/2009 | Chopdekar et al. | |
| 2003/0157280 A1 | 8/2003 | Boissonnat et al. | |
| 2004/0062915 A1 | 4/2004 | Pabedinskas et al. | |
| 2008/0268225 A1 | 10/2008 | Dehennau et al. | |
| 2009/0077894 A1 | 3/2009 | King et al. | |
| 2010/0075104 A1 | 3/2010 | Dehennau et al. | |

FOREIGN PATENT DOCUMENTS

| | | |
|---|---|---|
| EP | 0179688 A1 | 4/1986 |
| EP | 0441449 A1 | 8/1991 |
| EP | 1525969 A1 | 4/2005 |
| GB | 711266 A | 6/1954 |
| GB | 2144472 A | 3/1985 |
| JP | 54-6258 B1 | 3/1979 |
| JP | 2-258255 A | 10/1990 |
| WO | WO 01081072 A1 | 11/2001 |
| WO | WO 0198064 A2 | 12/2001 |
| WO | WO 0226463 A2 | 4/2002 |
| WO | WO 2005038125 A1 | 4/2005 |
| WO | WO 2008065061 A1 | 6/2008 |

* cited by examiner

MANUFACTURE AND USE OF A COMPOSITE MATERIAL COMPRISING FIBRES AND AT LEAST ONE VINYL CHLORIDE POLYMER

CROSS-REFERENCE TO RELATED APPLICATIONS

This application is a U.S. national stage entry under 35 U.S.C. §371 of International Application No. PCT/EP2012/056306 filed Apr. 5, 2012, which claims priority to French application No. 11.53150 filed on Apr. 11, 2011 and of French application No 11.60168 filed on Nov. 8, 2011, the whole content of these applications being incorporated herein by reference for all purposes.

TECHNICAL FIELD OF THE INVENTION

The present invention relates to a process for manufacturing a composite material comprising fibres and at least one vinyl chloride polymer. It also relates to this composite material itself. It further relates to the use of this composite material for forming articles or for manufacturing reinforced objects and also to these articles or reinforced objects themselves and reinforced profiles.

BACKGROUND OF THE INVENTION

Many joinery elements such as frames, framework, jambs and transoms of windows, shutters, doors and gates are frequently formed based on PVC (polyvinyl chloride), which gives them durability, corrosion resistance and thermal insulating properties, while requiring only a minimum amount of maintenance. However, they lack rigidity from certain dimensions onwards.

Indeed, the PVC profiles used for the construction of these joinery elements are generally hollow in order to lighten them and create chambers that have a thermal insulation role. However, one problem inherent to PVC is its low elastic modulus and therefore its deformability under strain, especially when the spans between fixed points are large.

The lack of rigidity may be overcome by reinforcing the frames with metal reinforcements and especially steel (see document DE 199 33 099) or aluminium reinforcements. However, the use of metal reinforcements creates thermal bridges within the profiles of the frame leading to significant heat losses via the increase of the thermal conductivity. Furthermore, the presence of these metal reinforcements complicates the end-of-life recycling of the profiles.

In order to counteract this increase of the thermal conductivity, it has been proposed to use reinforcements (pultruded inserts) constituted of thermosetting resins with fibres, preferably continuous fibres, of glass, aramid or carbon (documents GB 2 144 472 or EP 0 441 449). However, the use of thermosetting resins with glass fibres is expensive. As regards the thermoplastic composite materials reinforced by cellulose fibres described in document US 2004/062915, they are much more moisture-sensitive and therefore less durable.

Conventionally, PVC profiles reinforced by introduction of a metal insert or of a pultruded insert are not recyclable or are difficult to recycle. Another disadvantage of profiles reinforced by a pultruded insert is the fact that it is necessary, just like for metal reinforcements, to manually introduce the reinforcement, which increases their production cost.

Described in document EP 1 276 602 are joinery elements comprising a PVC profile reinforced by at least one reinforcing tape composed of fibres made of polyester, in particular made of PET (polyethylene terephthalate) or of PBT (polybutylene terephthalate) commingled with continuous glass fibres; the polymer fibres and glass fibres being arranged in a longitudinal and parallel manner. The tapes of fibres, or rovings, are heated in order to melt the polymer, pressed and finally embedded in the outer and opposite walls of the final PVC profile to provide sufficient rigidity and thus avoid the use of metal or pultruded inserts. Even though high mechanical properties are obtained and the manual insertion of the metal or pultruded profile is avoided owing to the manufacturing process which uses reels that make it possible to unwind continuous yarns comprising continuous filaments of glass and of a thermoplastic commingled together, this process has many disadvantages. One of the drawbacks of this system is combining two different thermoplastics that are incompatible in the melt state, a polyester such as PET or PBT on the one hand and PVC on the other hand, in the final product, making not only the recycling of the profile difficult, but also making the recycling of the production scrap and also of the blanks impossible in the production line of the profiles. Another drawback is the longitudinal brittleness of the reinforcements which preferably break along the fibres during a multiaxial impact. Finally, one major drawback is the difficulty in calibrating the profile when it is cooling considering that the PVC and the reinforcing tape have different thermal expansion coefficients.

In document EP 0 179 688, it has been proposed to subject reinforcing elements (especially glass fibres) for composite materials to an electrostatic field induced by a very high voltage electric current, then to impregnate them with a liquid matrix material (or liquid precursor of the material), while they are still under the influence of the field. The very high voltages that must be used in order to carry out this process are not without danger for the operators and require a lot of electrical energy; it is not easy either to correctly synchronize the swelling of the reinforcing fibres under the action of the electrostatic field and their impregnation by the liquid matrix material.

SUMMARY OF THE INVENTION

The present invention aims to solve these problems by providing a process for manufacturing an easily recyclable composite material that can be formed into articles of higher rigidity and that can, in addition, be easily used according to conventional methods and especially by pultrusion, especially for producing reinforced objects.

For this purpose, the main subject of the invention is a process for manufacturing a composite material comprising fibres and at least one vinyl chloride polymer comprising the immersion of the fibres in a hydrosol of said polymer in order to obtain fibres coated with said hydrosol followed by the drying and gelling of said hydrosol coated on the fibres.

DETAILED DESCRIPTION OF THE INVENTION

The expression "composite material" is understood in the present description to mean a solid material comprising at least two components that are immiscible, but that have a high adhesion capacity; one of the components of this material being constituted of fibres that provide the mechanical strength; the other constituent, conventionally known as the "matrix", being the vinyl chloride polymer(s) that ensure(s) the cohesion of the structure and the retransmission of the stresses to the fibres.

The term "fibres" is understood to mean, in the present description, any elementary (or unitary) fibre (also known as a "filament") and also any assembly of elementary fibres.

Examples of an assembly of elementary fibres are woven fabrics (i.e. an assembly where the elementary fibres are arranged, for one part, in the length direction and, for the other part, in the width direction), nonwoven fabrics also referred to as "mats" (i.e. an assembly where the elementary fibres are arranged randomly in one main plane) and "rovings" (i.e. an untwisted assembly of several elementary fibres).

Advantageously, one of the characteristic dimensions ("length") of these fibres is considerably larger than the other ("diameter" in the case of the filament) or at least than one of the two others ("thickness" and "width" in the case of an assembly of elementary fibres). In the case where one of the components of the composite material according to the invention is an assembly of elementary fibres, their length is preferably considerably larger than both their thickness and their width.

The expression "considerably larger" should be understood to mean more than 10 times larger, preferably more than 25 times larger, more preferably still more than 100 times larger and very particularly preferably more than 500 times larger. According to another term, the fibres according to the invention may be referred to as continuous fibres.

Preferably, the fibres are an assembly of elementary fibres, particularly preferably they are an assembly of elementary fibres chosen from woven fabrics, nonwoven fabrics and rovings.

In this preferred case, the assembly may or may not be ordered and may or may not be regular. The elementary fibres may be arranged in the assembly:

- in an ordered manner and be entangled, as in the case of woven fabrics;
- in a disordered manner and be entangled, as in the case of nonwoven fabrics or "mats", or
- in an unentangled manner, longitudinally and parallel to one another, as in the case of "rovings".

Very particularly preferably, the fibres are an assembly of elementary fibres chosen from woven fabrics and "rovings", with a very particular preference for rovings.

In this case, the elementary fibres of the assembly are therefore advantageously arranged in an unentangled manner, longitudinally and parallel to one another.

The fibres that can be used according to the invention may be any commercially available fibres. They may be organic fibres, mineral fibres, mixtures of organic fibres and mineral fibres, mixtures of various organic fibres with one another and mixtures of various mineral fibres with one another.

Mention may be made, as examples of organic fibres, of the fibres derived from natural products, of plant or animal origin, such as hemp, flax, cotton, wood and silk for example, or from synthetic products such as polymeric fibres.

Mention may be made, as examples of mineral fibres, of asbestos fibres, glass fibres, metallic fibres and basalt fibres for example.

According to a first alternative, the fibres are fibres resulting from products of plant origin chosen from hemp and flax.

According to a second alternative, the fibres are mineral fibres chosen from glass fibres and basalt fibres.

Very good results have been recorded when the fibres are rovings of flax fibres, rovings of glass fibres or rovings of basalt fibres.

The fibres that can be used according to the invention may have been coated with a coupling agent during their manufacturing cycle, thus improving the homogeneity of their subsequent impregnation by the hydrosol of vinyl chloride polymer and the mechanical properties of the composite material. Among the coupling agents customarily used, mention may be made, non-exhaustively, of silanes, polyesters, acrylic or methacrylic polymers, waxes and epoxides. Among these, silanes are preferred. As examples, mention may especially be made of 3-aminopropyltrimethoxysilane and 3-aminopropyltriethoxysilane and also derivatives thereof such as gamma-methacryloxypropyltrimethoxysilane, N-benzyl-N-aminoethyl-3-aminopropyltrimethoxysilane and the corresponding hydrochloride, N-phenyl-3-aminopropyltrimethoxysilane and N-2-(vinylbenzylamino) ethyl-3-aminopropyltrimethoxysilane.

The composite material manufactured according to the invention may be flexible (and therefore can be wound) or may be more or less rigid.

As for the fibres, one of the characteristic dimensions ("length") of the composite material manufactured according to the invention is considerably larger than the other ("diameter" in the case of a filament) or at least than one of the two others ("thickness" and "width" in the case of an assembly of elementary fibres). In the preferred case where the composite material comprises an assembly of elementary fibres, the length of the composite material is considerably larger than both its thickness and its width.

The expression "considerably larger" has the same meaning as when used above in connection with the fibres.

The composite material manufactured according to the invention comprises at least one vinyl chloride polymer. In the present description, the expression "vinyl chloride polymer" or more briefly, "polymer" is understood to mean all polymers containing at least around 50% by weight, preferably at least 60% by weight, particularly preferably at least 70% by weight and very particularly preferably at least 85% by weight of monomer units derived from vinyl chloride, therefore both vinyl chloride homopolymers (containing 100% by weight of monomer units derived from vinyl chloride) and copolymers of vinyl chloride with vinyl esters such as vinyl acetate. Among the vinyl chloride polymers mentioned above, preference is accorded to vinyl chloride homopolymers and to copolymers of vinyl chloride with vinyl acetate, with a particular preference to vinyl chloride homopolymers. The vinyl chloride polymer is therefore preferably a homopolymer.

Use is advantageously made, within the context of the invention, of vinyl chloride polymers, preferably vinyl chloride homopolymers, having a melt flow index or K-value (conventionally known as Kw or K-wert), measured according to the standard ISO 1628-2, of greater than 55, preferably greater than 60. This K-value is advantageously less than 85, preferably less than 80. For practical reasons (commercial availability), use if very particularly preferably made of polymers having a K-value between 65 and 75.

In the present description, the expression "at least one vinyl chloride polymer" means that the composite material may contain a single polymer or several polymers of vinyl chloride. The term "polymer" is used indiscriminately in the singular and in the plural in the present description.

In the case where the composite material may contain several vinyl chloride polymers, these may be mixtures of homopolymers having different melt flow indexes, mixtures of homopolymers and of copolymers or else mixtures of copolymers having different monomer compositions with one another. Preferably, the composite material comprises a single vinyl chloride polymer that is particularly preferably a vinyl chloride homopolymer.

The process according to the invention comprises the immersion of the fibres in a hydrosol of the vinyl chloride polymer.

In the present description, the term "hydrosol" is understood to mean a fluid and colloidal system in which the dispersed phase comprises the vinyl chloride polymer and in which the continuous phase is water.

The hydrosol of the vinyl chloride polymer is advantageously obtained by radical polymerization in aqueous emulsion.

The expression "radical polymerization in aqueous emulsion" is understood in the present description to mean any radical polymerization process that takes place in an aqueous medium in the presence of emulsifiers (for example, sodium alkylsulphates and sodium alkylarylsulphonates, etc.) and of radical initiators.

This definition specifically encompasses the "classic" polymerization in aqueous emulsion, in which use is made, besides an aqueous polymerization medium, of at least one water-soluble radical initiator (chosen, for example, from water-soluble peroxides such as alkali metal or ammonium persulphates, hydrogen peroxide, perborates, t-butyl hydroperoxide, etc.) and at least one emulsifier; and also polymerization in aqueous microsuspension, also called polymerization in homogenized aqueous dispersion, in which use is made of at least one oil-soluble initiator (chosen, for example, from oil-soluble organic peroxides and oil-soluble diazo compounds, etc.) and an emulsion of monomer droplets is prepared by virtue of a powerful mechanical stirring and the presence of emulsifiers.

Preferably, the hydrosol of the vinyl chloride polymer is obtained by "classic" radical polymerization in aqueous emulsion.

The aqueous dispersions (also known as latices) of vinyl chloride polymer thus produced, which are the hydrosols used in the process according to the invention, contain elementary polymer particles having very small mean diameters that may range from around 10 to around 5000 nm (nanometers), preferably from around 50 to around 1500 nm.

The vinyl chloride polymer content of the hydrosol is advantageously greater than 15% by weight, preferably greater than 20% by weight, very particularly greater than 25% by weight. It is advantageously less than 50% by weight, preferably less than 40% by weight, very particularly less than 35% by weight.

The hydrosol that can be used according to the invention advantageously also contains at least one plasticizer such as a dialkyl phthalate or an alkyl adipate, and, optionally, other conventional additives, such as stabilizers, anti-foaming agents, anti-scaling agents, thickeners, pigments, dyes, etc. The hydrosol does not advantageously contain an organic solvent.

For the implementation of the process according to the invention, the fibres are immersed in the hydrosol in order to obtain fibres coated with said hydrosol. For this purpose, the fibres, which are advantageously in one of the aforementioned physical forms, may optionally be subjected firstly to one or more of the following treatments:
  in the case of an assembly of elementary fibres, passing through a device to spread the fibres apart in the transverse direction;
  passing through tension control means;
  antistatic treatment.

The fibres are then advantageously submerged in a bath of hydrosol having dimensions suitable for ensuring their complete immersion, resulting in their coating by the hydrosol. This immersion is advantageously carried out at a temperature between 0° C. and the glass transition temperature of the polymer, preferably between 15° C. and 40° C. This immersion is advantageously carried out at a pressure between 0.1 and 10 MPa, preferably in the vicinity of atmospheric pressure (0.1 MPa). The respective amounts of fibres and of hydrosol used are advantageously such that the final composite material advantageously contains between 50% and 95%, preferably between 60% and 90% and particularly preferably between 70% and 90% by weight, of fibres and advantageously between 50% and 5%, preferably between 40% and 10% and particularly preferably between 30% and 10% by weight, of polymer.

The step of immersing the fibres in the hydrosol may be carried out continuously or in batch mode. It is preferred to carry out this step continuously. In this case, if the fibres are packaged on a reel or on a roll, they are advantageously first unwound with a view to passing them into the bath of hydrosol.

The immersion of the fibres in the hydrosol is then followed by the drying of the hydrosol. Any known drying method that enables water to be removed from a dispersion of a solid in an aqueous phase is suitable for drying the hydrosol. It being understood that, in the process according to the invention, the hydrosol to be dried is usually in the form of a film or a layer coating the fibres and the thickness of which is often between 0.1 and 1 mm, preferably between 0.2 and 0.6 mm, it may advantageously be dried—after optional scraping of the possible surplus of hydrosol—for example by the following means, applied separately or in combination: putting under vacuum; microwave heating; application of infrared radiation; application of hot air via blowers or fans; passing between heated and rotating rolls or between heated and fixed bars, etc.

The hydrosol is preferably dried by application of hot air, preferably heated to a temperature below the decomposition temperatures of the hydrosol and of the fibres. This temperature is preferably less than or equal to 160° C., more particularly less than or equal to 150° C. Preferably, the temperature of the air for drying the hydrosol is greater than or equal to 80° C., more particularly greater than or equal to 110° C.

The drying of the hydrosol may be carried out continuously or in batch mode. It is preferred to carry it out continuously. In the case where the drying of the hydrosol is carried out continuously by application of air, use is advantageously made of a drying tunnel or hot-air generators that are regularly spaced along the path of the composite material being manufactured.

The drying may be carried out in a single step or in several steps which may be carried out at different temperatures. It is preferably carried out in several steps, particularly preferably in two steps and very particularly preferably in two different steps with different temperatures.

After drying the hydrosol, it is gelled (i.e. its constituent particles change from a heterogeneous phase to a homogeneous phase (free of grain structure)), advantageously under the action of heat. The hydrosol may advantageously be gelled by application of infrared radiation or laser radiation. The hydrosol is preferably gelled by application of infrared radiation bringing the hydrosol to a temperature above the glass transition temperature of the polymer that it contains and below the decomposition temperature of the fibres. This temperature is preferably less than or equal to 250° C., more particularly less than or equal to 230° C. Preferably, this temperature is greater than or equal to 100° C., more particularly greater than or equal to 150° C.

Like the steps of immersing the fibres in the hydrosol and of drying the hydrosol, the step of gelling the hydrosol may be carried out continuously or in batch mode. It is preferred to carry out this step continuously.

The composite material, obtained at the end of the manufacturing process described above, may then be subjected to treatments, the nature of which differs depending on whether this material is intended either to be stored with a view to a subsequent use, or to be used immediately (i.e. in-line with its manufacture).

In any case, the definitive shape of the composite material obtained is advantageously imparted thereto by subjecting it to a shaping treatment capable of giving it a uniform thickness, for example calendering or laminating in a press or between cooled or uncooled rolls, optionally combined with a mechanical treatment capable of giving it the desired uniform width, for example by passing between blades positioned parallel to the longitudinal axis of the advancing structure, or to a combination of these two methods.

The thickness of the composite material obtained may advantageously vary between 0.1 and 3 mm, preferably between 0.15 and 2 mm, very particularly between 0.2 and 1 mm. The width of the composite material obtained may be very variable, depending on the physical form of the fibres from which it has been made. In the frequent case where the composite material obtained is in the form of a roving, this width is advantageously between 3 and 100 mm, preferably between 5 and 50 mm, very particularly between 5 and 25 mm.

If the composite material is intended to be stored before it is used, it is advantageously, after an optional supplementary cooling, wound around itself in the form of a reel or roll if it is flexible or stored by stacking cut films or sheets if it is rigid.

If the composite material is intended to be used immediately, it is advantageously introduced into a suitable shaping device (see below).

In another aspect, the present invention relates to a composite material as described above in connection with the process. In particular, the invention proposes a composite material comprising fibres coated with at least one vinyl chloride polymer by immersion of said fibres in a hydrosol of said polymer in order to obtain fibres coated with said hydrosol followed by the drying and gelling of said hydrosol coated on the fibres. The composite material according to the invention is advantageously obtained by the process according to the invention. The definitions, limitations and preferences mentioned and described above for the process of the invention according to the invention apply therefore to the composite material according to the invention.

Another aspect of the invention further relates to the use of the composite material according to the invention or of the composite material obtained by the process according to the invention for forming articles on the one hand, and for manufacturing reinforced objects on the other hand. For this purpose, the composite material may be used via any known method that is compatible with its components, such as, for example, calendering, thermoforming, pultrusion, coextrusion, etc.

The composite material according to the invention may be used as fibrous reinforcement, for example for sheets for interior fittings in the motor vehicle industry, in the shipbuilding industry, in furniture, in the building industry; as external reinforcement for pipes and hose; as reinforcement for injection-moulded parts; etc.

Particularly advantageously, the composite material according to the invention may be used for the manufacture of reinforced profiles made of a thermoplastic, preferably made of rigid PVC, such as joinery elements, especially elements of fixed frames and/or shutters and/or doors and/or gates and/or window frames. In this application, the composite material according to the invention advantageously improves the rigidity of the profiles and their tensile strength in the longitudinal direction. Furthermore, the rigid PVC profiles reinforced by composite structures of the invention are easily recyclable.

Another aspect of the invention finally relates to the articles or reinforced objects obtained from the composite material described above or from the composite material obtained by the process according to the invention described above. This aspect of the invention relates more particularly to the profiles reinforced by the composite material above or by the composite material obtained by the process described above.

Should the disclosure of any patents, patent applications, and publications which are incorporated herein by reference conflict with the description of the present application to the extent that it may render a term unclear, the present description shall take precedence.

Figure 1:
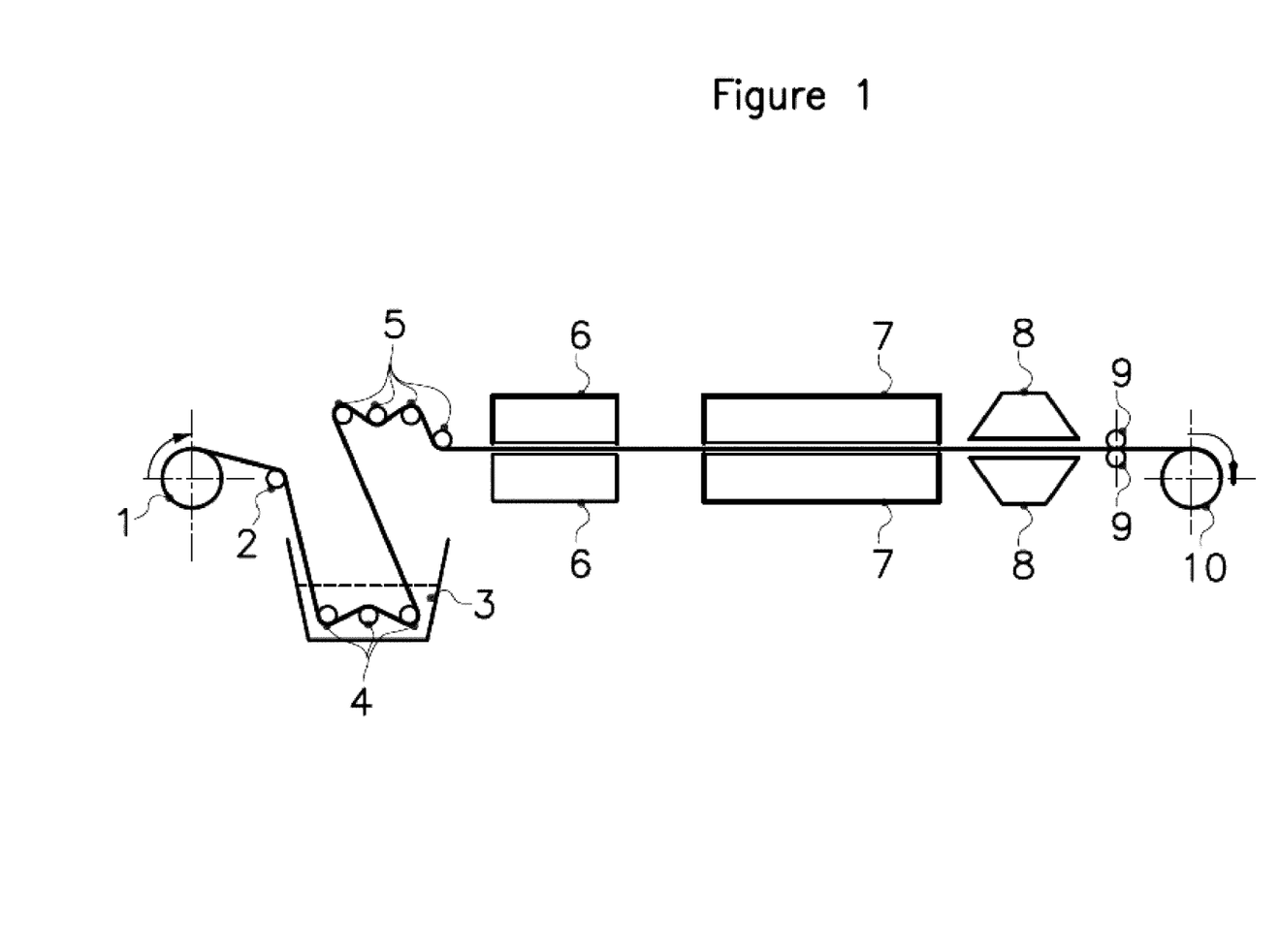
FIG. 1 schematically represents one practical embodiment of the process for the manufacture of a composite material according to the present invention.

The process for the manufacture of a composite material according to the invention will now be illustrated by the examples below which refer to the drawing that accompanies the present description. This drawing consists of the appended FIG. 1, schematically representing one practical embodiment of this subject of the invention. Those examples are intended to illustrate the invention without however limiting the scope thereof.

Example 1

A reel 1 delivered a "roving" of glass fibres supplied by the company Owens Corning Vetrotex under the name RO 99 P 192 having a linear density of 4800 tex (4.8 g/m measured according to the standard ISO 1889), which were treated with a silane-based coupling agent, and the diameter of the constituent filaments of which was 24 μm. This "roving", advancing at a speed of 2.5 m/min, was immersed, at 23° C. and under atmospheric pressure, via the roll 2, in a hydrosol bath 3, positioned in which were cylindrical bars 4, arranged in staggered rows relative to one another and the respective heights and spacings of which were adjustable in order to impose the desired tension on the "roving".

The hydrosol bath 3 had the following composition:
31.40% by weight of a dispersion of a vinyl chloride homopolymer having a K-value equal to 72 (polymerized in classic aqueous emulsion) sold by the company Solvin under the name 072 GA;

12.44% by weight of plasticizer (diisononyl phthalate);
0.65% by weight of heat stabilizer (di(n-octyl)tin thioglycolate);
0.91% by weight of an anionic emulsifier (mixture of fatty acid sodium salt and of sodium dodecylbenzenesulphonate);
0.50% by weight of a nonionic emulsifier sold under the name Triton X 100 by Sigma Chemical;
0.5% by weight of cellulose ether;
53.6% by weight of water.

The "roving" of glass fibres impregnated with the hydrosol was drawn out of the bath 3 by the series of cylindrical bars 5, which also ensured the correct tension thereof, and conveyed between the fans 6 blowing air at 120° C. at a flow rate of 33 l/sec then between the fans 7 blowing air at 145° C. at a flow rate of 17 l/sec.

The precursor of the composite material was then conveyed, in order to gel the hydrosol for about twenty seconds, between the IR radiation diffusers 8, the faces of which irradiating towards the structure are brought to a temperature of 220° C.

The composite material thus obtained, containing around 80% by weight of glass fibres, was then passed between the laminating rolls 9 in order to shape it into a tape having a thickness of 0.2 mm and a width of 10 mm, which was collected on the reel 10.

In order to determine the mechanical properties of the composite material thus obtained, pieces of the tape obtained were placed in a mould side by side and on top of one another while orienting them in the same direction, in order to obtain, after pressing, a sheet having a thickness of 1.7 mm.

The impact strength of these sheets, measured according to the standard ISO 6603, was 7.6 J/mm. The tensile modulus, elongation at break and tensile strength, measured in the longitudinal direction according to the standard ISO 527, were respectively 47.6 GPa, 0.71% and 301 MPa.

Example 2

A reel 1 delivered a "roving" of flax fibres supplied by the company Depestele having a linear density of 0.5 g/m. This "roving" was then immersed in a hydrosol bath as described in Example 1.

The hydrosol bath had the following composition:
31.04% by weight of a dispersion of a vinyl chloride homopolymer having a K-value equal to 72 (polymerized in classic aqueous emulsion) sold by the company Solvin under the name 072 GA;
12.30% by weight of plasticizer (diisononyl phthalate);
0.65% by weight of heat stabilizer (di(n-octyl)tin thioglycolate);
0.90% by weight of an anionic emulsifier (mixture of fatty acid sodium salt and of sodium dodecylbenzenesulphonate);
0.49% by weight of a nonionic emulsifier sold under the name Triton X 100 by Sigma Chemical;
1.14% by weight of cellulose ether;
53.49% by weight of water.

The "roving" of flax fibres impregnated with the hydrosol was then treated like the "roving" mentioned in Example 1.

The precursor of the composite material was then conveyed, in order to gel the hydrosol for about twenty seconds, between the IR radiation diffusers 8, the faces of which irradiating towards the structure were brought to a temperature of 200° C.

The composite material thus obtained, containing around 50% by weight of flax fibres, was then passed between the laminating rolls 9 in order to shape it into a tape having a thickness of 0.2 mm and a width of 5 mm, which was collected on the reel 10.

In order to determine the mechanical properties of the composite material thus obtained, pieces of the tape obtained were placed in a mould side by side and on top of one another while orienting them in the same direction, in order to obtain, after pressing, a sheet having a thickness of 0.5 mm.

The tensile modulus, elongation at break and tensile strength, measured in the longitudinal direction according to the standard ISO 527, were respectively 14.6 GPa, 1.67% and 190 MPa.

The mechanical properties of a fabric made from the impregnated tapes were also determined. In order to do this, the tapes were woven and the fabric obtained was placed in a mould, in several thicknesses while orienting the fibres of the fabric in the same direction, in order to obtain, after pressing, a sheet having a thickness of 0.97 mm.

The tensile modulus, elongation at break and tensile strength, measured according to the standard ISO 527, were respectively 8.3 GPa, 1.69% and 100 MPa.

Example 3

A reel 1 delivered a "roving" of basalt fibres supplied by the company Flocart under the name KVT1200Tex13EKV11, having a linear density of 1200 tex (measured according to the standard ISO 1889). This "roving" was then immersed in a hydrosol bath as described in Example 1.

The hydrosol bath had the same composition as in Example 2.

The "roving" of basalt fibres impregnated with the hydrosol was then treated like the "roving" mentioned in Example 1.

The precursor of the composite material was then conveyed, in order to gel the hydrosol for about twenty seconds, between the IR radiation diffusers 8, the faces of which irradiating towards the structure are brought to a temperature of 190° C.

The composite material thus obtained, containing around 80% by weight of basalt fibres, was then passed between the laminating rolls 9 in order to shape it into a tape having a thickness of 0.2 mm and a width of 4 mm, which was collected on the reel 10.

In order to determine the mechanical properties of the composite material thus obtained, pieces of the tape obtained were placed in a mould side by side and on top of one another while orienting them in the same direction, in order to obtain, after pressing, a sheet having a thickness of 0.78 mm.

The tensile modulus, elongation at break and tensile strength, measured in the longitudinal direction according to the standard ISO 527, were respectively 43.9 GPa, 0.05% and 397 MPa.

The mechanical properties of a fabric made from the impregnated tapes were also determined. In order to do this, the tapes were woven and the fabric obtained was placed in a mould, in several thicknesses while orienting the fibres of the fabric in the same direction, in order to obtain, after pressing, a sheet having a thickness of 0.52 mm.

The tensile modulus, elongation at break and tensile strength, measured according to the standard ISO 527, were respectively 12 GPa, 0.47% and 263 MPa.

Figure 2:
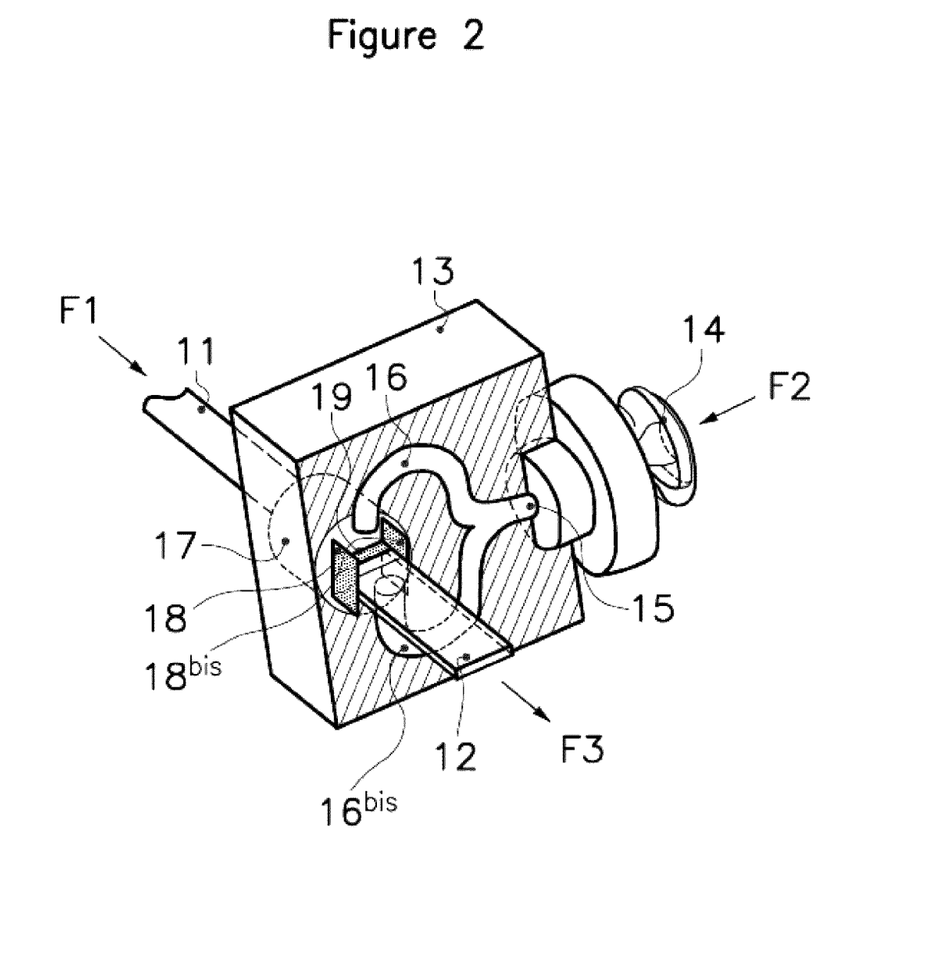
FIG. 2 schematically represents, in perspective, a partially exploded cross section of a device for shaping reinforced profiles manufactured by using a composite material according to the present invention.

A use of the composite material, obtained according to Example 1, for manufacturing reinforced profiles is illustrated by referring to another drawing that accompanies the present description. This drawing consists of the appended FIG. 2, schematically representing, in perspective, a partially exploded cross section of a device 13 for shaping the profiles. The cross section is made along a plane that passes vertically through the device 13 in its middle (of which only the rear half is thus displayed), perpendicular to the plane of the composite material in the form of a tape 11 obtained as described above and to the direction of travel of this tape, indicated by the arrow F1.

The shaping device 13 was supplied, on the one hand, with the tape 11, via the adapting piece 17 equipped with a through slit 19 and, on the other hand, with a die 15, located at the end of the screw head 14 of a conventional extruder (not represented) which provided, under pressure, molten PVC, introduced in the direction of the arrow F2.

The exploded part of the cross section of the shaping device 13 makes it possible to display the molten PVC feed means 14 and 15 and the route of this molten PVC into the shaping device 13, via the channels 16 and 16 bis, in order to emerge in front of the through slit 19 at the front end of the adapting piece 17, on top of and underneath the advancing tape 11. The through slit 19 is bordered by 2 walls 18 and 18 bis so that the molten PVC homogeneously coats the two faces of the tape 11 in order to result in the profile 12 emerging from the device 13 in the direction of the arrow F3.

Figure 3:
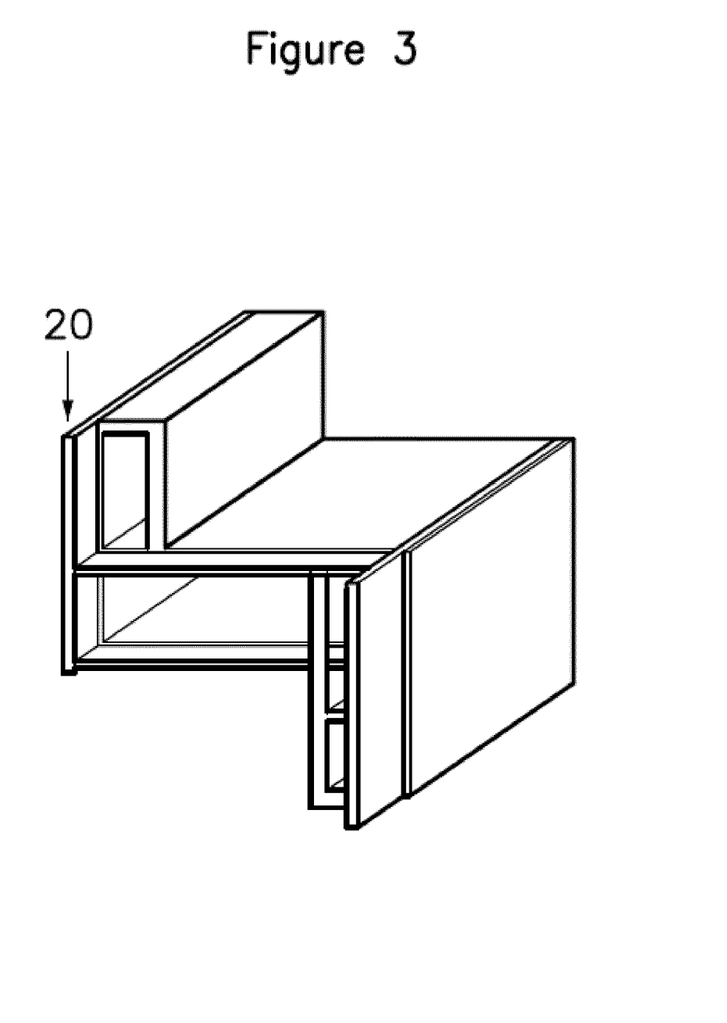
FIG. 3 represents a section of an opening window frame made of PVC and reinforced by a composite material according to the present invention.

A profile reinforced by the composite material according to the invention is illustrated by referring to another drawing that accompanies the present description. This drawing consists of the appended FIG. 3 which represents a section of an opening window frame made of PVC. This opening frame has been reinforced by a composite material 20 in the form of a 2 mm-thick tape manufactured as indicated in FIG. 1 and its description above. This structure has made it possible to increase the length of the opening frame by more than 60% compared to an unreinforced profile and by 10% compared to a profile reinforced by a 1 mm steel reinforcement.

The invention claimed is:

1. A process for manufacturing a composite material comprising mineral fibres and at least one vinyl chloride polymer comprising immersing the mineral fibres in a hydrosol of said polymer in order to obtain mineral fibres coated with said hydrosol followed by drying and gelling of said hydrosol coated on the mineral fibres, wherein the hydrosol does not contain an organic solvent, and the hydrosol is a fluid and colloidal system having a dispersed phase and a continuous phase, the dispersed phase comprising the vinyl chloride polymer and the continuous phase is water, and the hydrosol comprises 15 wt. % to less than 40 wt. % of the vinyl chloride polymer.

2. The process according to claim 1, wherein the hydrosol has 15 wt. % to 35 wt. % of the vinyl chloride polymer.

3. The process according to claim 1, wherein the vinyl chloride polymer is a homopolymer.

4. The process according to claim 1, wherein the hydrosol of the vinyl chloride polymer is obtained by radical polymerization in aqueous emulsion.

5. The process according to claim 1, wherein the mineral fibres are an assembly of elementary fibres selected from the group consisting of woven fabrics, nonwoven fabrics and rovings.

6. The process according to claim 1, wherein the mineral fibres are selected from the group consisting of glass fibres and basalt fibres.

7. The process according to claim 1, wherein the mineral fibres are rovings of glass fibres or rovings of basalt fibres.

8. The process according to claim 1 further comprising submerging the mineral fibres in a bath of hydrosol having dimensions suitable for ensuring their complete immersion, resulting in their coating by the hydrosol.

9. The process according to claim 1, wherein the mineral fibres are coated with the hydrosol to form a hydrosol layer that is between 0.1 mm and 1 mm in thickness on the mineral fibres.

10. The process according to claim 1 further comprising drying the hydrosol by application of hot air.

11. The process according to claim 1 further comprising drying the hydrosol by application of hot air, and heating the hydrosol coated on the mineral fibres to a temperature below the decomposition temperatures of the hydrosol and of the mineral fibres.

12. The process according to claim 1 further comprising gelling the hydrosol by application of infrared radiation bringing the hydrosol to a temperature above the glass transition temperature of the polymer that it contains and below the decomposition temperature of the mineral fibres.

13. The process according to claim 1, wherein the gelling of the hydrosol coated on the mineral fibres is performed at a temperature greater than or equal to 150° C. to less than or equal to 250° C.

14. The process according to claim 1, wherein the composite material is between 0.1 mm and 3 mm thick.

\* \* \* \* \*